(No Model.)

S. A. WALKER.
ANT TRAP.

No. 464,535. Patented Dec. 8, 1891.

Witnesses
A. O. Babendreier
H. F. Riley

Inventor
Stephen A. Walker.
By his Attorneys,
C. A. Snow & Co.

UNITED STATES PATENT OFFICE.

STEPHEN A. WALKER, OF HAZLE DELL, TEXAS.

ANT-TRAP.

SPECIFICATION forming part of Letters Patent No. 464,535, dated December 8, 1891.

Application filed June 6, 1891. Serial No. 395,320. (No model.)

*To all whom it may concern:*

Be it known that I, STEPHEN A. WALKER, a citizen of the United States, residing at Hazle Dell, in the county of Comanche and State of Texas, have invented a new and useful Ant-Trap, of which the following is a specification.

The invention relates to improvements in ant-traps.

The object of the present invention is to provide a trap adapted for use in houses, on the ground or other places, and capable of trapping ants and preventing their escape after being caught.

The invention consists in the construction and novel combination and arrangement of parts hereinafter fully described, illustrated in the accompanying drawings, and pointed out in the claim hereto appended.

Figure 1:
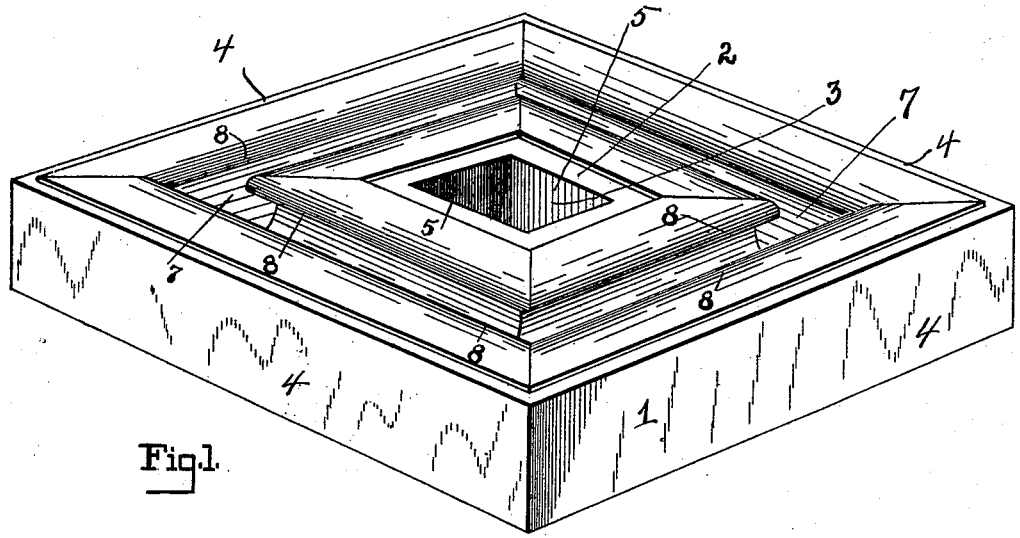
Figure 2:
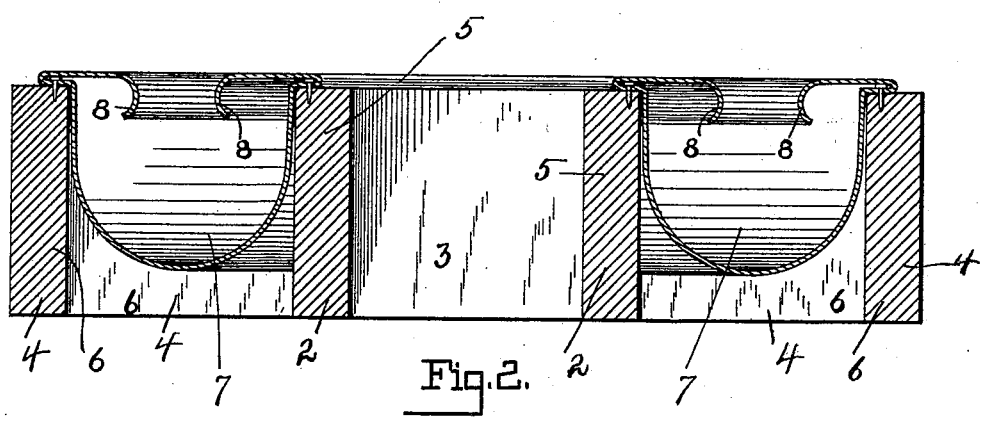

In the drawings, Figure 1 is a perspective view of an ant-trap constructed in accordance with this invention. Fig. 2 is a central vertical sectional view.

Referring to the accompanying drawings, 1 designates an ant-trap adapted to be placed over an ant bed or hill or adjacent thereto, to catch the ants, and consisting of an inner rectangular frame 2, forming a central opening 3, an outer rectangular frame 4, and a trough 7, connecting the frames 2 and 4 and adapted to receive and confine ants. The inner frame 2 consists of four sides 5, and the outer frame 4 is constructed of sides 6, arranged in a similar manner, and the adjacent sides of the inner and outer frames are arranged parallel with each other. The trough is constructed of sheet metal, and is curved or approximately semicircular in cross-section, and it consists of four sections having their ends secured together and being arranged between the frames 2 and 4, and having their edges secured to the upper edges of the frame and extending over about half the surface of the said upper edges, and are provided with integral flanges 8. The flanges are curved downward and extend inward over the trough, and they prevent ants from crawling up the sides of the trough and escaping from the trap. The outer surface—that is to say, the vertical faces—are wood, and the walls of the central openings 3 are wood, and ants will readily crawl up the same, and the trap may be entered by means of the central opening or from the exterior. A suitable bait may be employed and is placed in the trough to attract the ants, which will crawl up the sides of the frames and fall over the downwardly-curved edges of the flanges and drop into the trough, from whence they will be unable to escape. A suitable liquid may be placed in the trough to prevent the escape of the ants more effectively and to kill them.

From the foregoing description and the accompanying drawings, the construction, operation, and advantages of the invention will be readily understood.

What I claim is—

An ant-trap comprising the outer rectangular frame, the inner rectangular frame arranged within the outer frame and forming a central opening, the adjacent sides of the frames being parallel with each other, and the trough constructed of sheet metal, being curved in cross-section and arranged between the frames and connecting the same, and consisting of sections having their ends secured together and their longitudinal edges arranged on the upper edges of the frames and provided with flanges 8, extending inward over the trough and being curved downward and adapted to prevent the escape of ants, substantially as described.

In testimony that I claim the foregoing as my own I have hereto affixed my signature in presence of two witnesses.

STEPHEN A. WALKER.

Witnesses:
SILAS L. ROHRER,
MORRISON W. CARROLL.